2 Sheets—Sheet 1.
E. H. SMITH.
SEWING-MACHINE.
No. 6,807. Reissued Dec. 14, 1875.
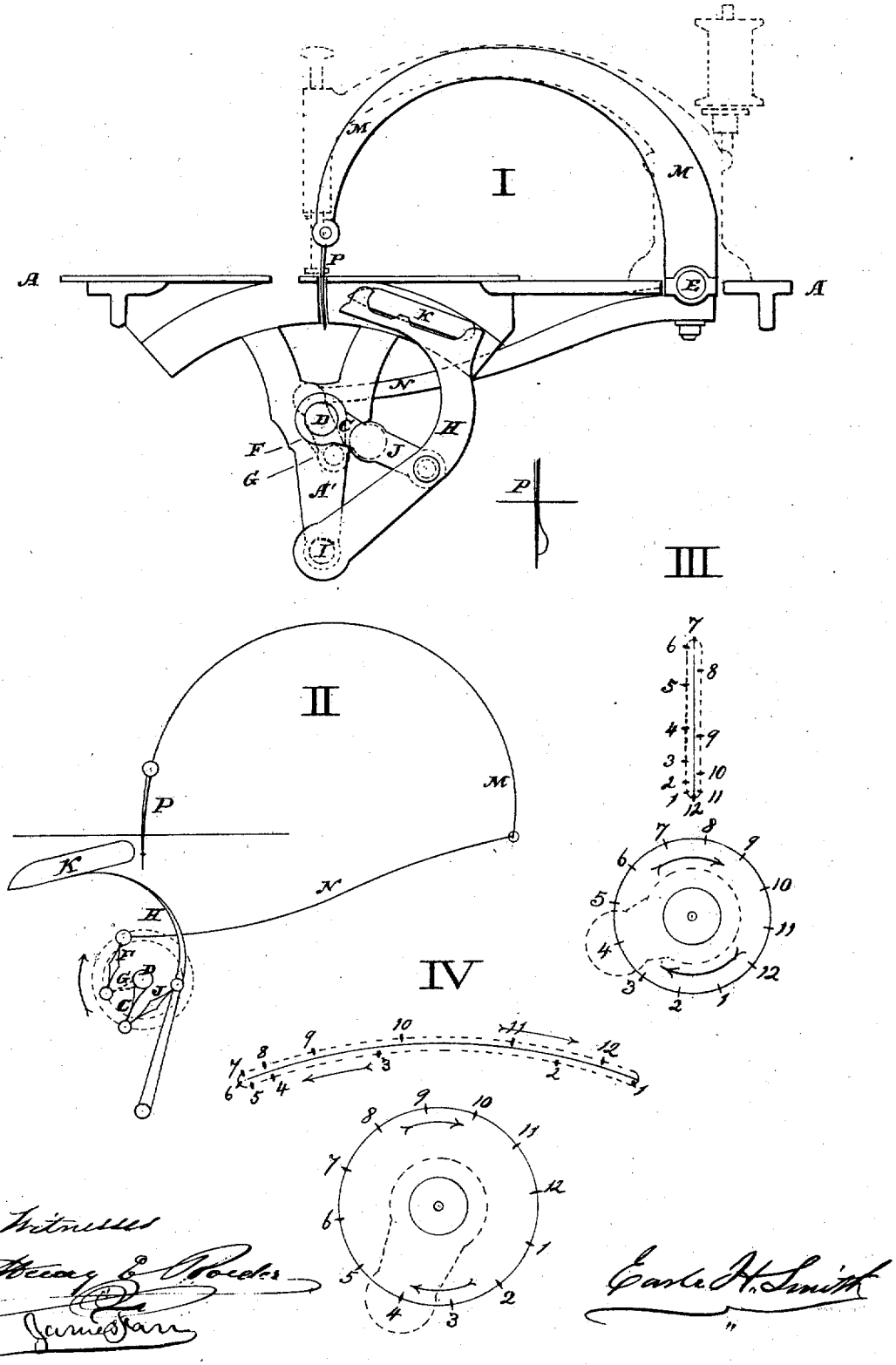
Witnesses
Wm. E. Rhodes
James Parr
Earle H. Smith
N. PETERS, PHOTO-LITHOGRAPHER, WASHINGTON, D. C.

2 Sheets—Sheet 2.
E. H. SMITH.
SEWING-MACHINE.
No. 6,807. Reissued Dec. 14, 1875.
V
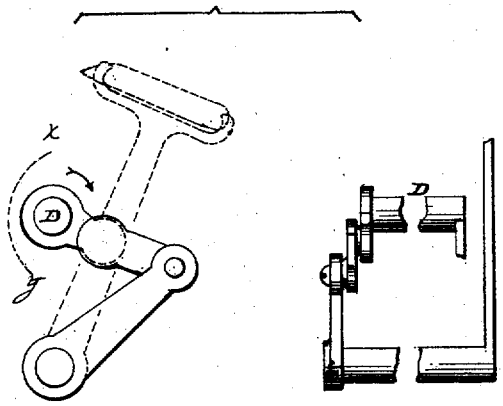
Witnesses:
J. J. Brown.
M. J. Wallack.
Earle H. Smith
N. PETERS, PHOTO-LITHOGRAPHER, WASHINGTON, D. C.

UNITED STATES PATENT OFFICE.

EARLE H. SMITH, OF NEW YORK, N. Y., ASSIGNOR TO MARGUERITE E. R. SMITH.

IMPROVEMENT IN SEWING-MACHINES.

Specification forming part of Letters Patent No. 20,175, dated May 4, 1858; extended seven years; reissue No. 6,807, dated December 14, 1875; application filed September 9, 1875.

*To all whom it may concern:*

Be it known that I, EARLE H. SMITH, of city, county, and State of New York, have invented, made, and applied to use, certain new and useful Improvements in Sewing-Machines, of which the following is a specification, reference being had to the accompanying drawing.

This invention relates to sewing-machines in which crank mechanism is used in operating both the needle and shuttle. Such mechanism has the advantage of being smooth and noiseless in motion, and is very desirable in a sewing-machine. It is of paramount importance, however, that the movements of the needle and shuttle take place in proper time with regard to each other, for the performance of their respective offices in sewing. Such proper timing involves a certain alternation in the action of the needle and shuttle, that occurs at each stitch: thus, the needle enters the cloth, the shuttle advances and passes through the loop of needle-thread, the needle is withdrawn, and the shuttle returns.

In all sewing-machines or patents therefor with which I am acquainted, the shuttle and needle are either worked by cranks and link-connections, without reference to such alternation, or else the needle or shuttle, or both, are worked by cam mechanism, which, though providing the proper relative movements, is attended with great friction and wear, and is neither smooth nor noiseless in action.

The present invention unites, with the smooth and easy motions, the necessary alternating feature, and dispenses with the necessity of using cams. This is accomplished by means of crank mechanism combined with the needle and shuttle, and arranged for imparting differential movements to the needle and shuttle, respectively, according to the wants of each other, or the requirements of both, in sewing. This differs from like mechanism described in the patents of C. A. Durgin, dated May 22, 1855, and J. B. Woodruff, dated July 3, 1855, as the movements of the needle and shuttle therein are not thus relatively differential, but are practically coincident throughout their stroke. It also differs from machines such as that of I. M. Singer, patented 1851, and those known as Howe machines, in which the proper timing or relative movement of the needle and shuttle is found, but the needle and shuttle are worked by cams.

By "cam" is meant a crooked groove—that is, a groove (or surface) of some form departing from a right line or the arc of a circle, acting on, or acted on by, a stud or roller.

Cams are not only attended with much noise, as well as rapid wear, but are a great absorbent of power in transmitting motion from the operator or motor to the work, making the machine hard to run, and the groove and roller are not adjustable to each other with facility to follow and take up the wear, as in link or crank mechanism. By link or crank mechanism is meant cranks and connections, the parts of which move in right lines, or on wrist-pins in circles or arcs of circles, such mechanism being lithe, quiet, and easy in its motion, and very durable.

In carrying my invention into practice, I have the crank mechanism constructed and arranged for causing the primary or driving crank of the needle—for example, during a part of the revolution of the primary shaft—to pass over a comparatively greater proportion of its path than that passed over by the needle in the same interval of time, during which interval the shuttle passes through the loop of needle-thread, after which the relation of the needle to the primary or driving crank as to speed is inverted during the remainder of the said shaft's revolution. The shuttle-crank, also, during a part of a revolution of the primary shaft, is arranged to pass over a comparatively greater proportion of its path than that traveled by the shuttle in the same interval of time, during which interval the loop is drawn from the shuttle and the stitch completed, after which the relation of the driving-crank and shuttle as to speed is changed during the remainder of that revolution of the shaft, the aforesaid changes or variations occurring as and when required in the different stages of the formation of each stitch, as hereinafter more fully set forth.

The nature of my invention consists in the combination, with the needle and shuttle, of crank mechanism, substantially as hereinafter described, arranged for retarding the needle in the cloth and forming a loop for the shuttle to enter, and for imparting a continuous motion to the shuttle while the needle is thus retarded; also, in the aforesaid combination of needle and shuttle with crank mechanism, arranged for retarding the movement of the shuttle after passing through the loop, and for imparting at the same time a continuous motion to the needle; also, in the aforesaid combination of needle and shuttle with crank mechanism, arranged for accelerating the movement of the needle after the passage of the shuttle through the loop, and at the same time retarding that of the shuttle; also, in the aforesaid combination of needle and shuttle with crank mechanism, arranged for accelerating the movement of the shuttle in passing through the loop, while that of the needle is retarded; also, in a certain combination of shuttle, carrier-lever, primary shaft, crank, and connecting-link, as hereinafter described.

To enable others skilled in the art to comprehend my invention, I have shown in the accompanying drawing parts of a sewing-machine embodying the same.

Figure I in the drawing represents a vertical section of said machine, taken through the line of the needle-groove in the shuttle-race, showing the needle as about to rise and form the usual bow or loop, and the shuttle as about to advance and enter it. Fig. II is a diagram showing the shuttle as having passed through the loop. Figs. III and IV are diagrams wherein the length of stroke of the needle and shuttle, and the paths of the driving-cranks, are laid out and divided off, so as to illustrate the differential or variable character of the motions of the needle and of the shuttle, as compared with the regular motion of the primary shaft, by twelfths of a revolution of said shaft when moving at a uniform speed. Fig. V is modification.

A A′ represent the bed and frame, and D the primary shaft. The usual fixed arm, presser-foot, &c., are shown in dotted lines. The shuttle K is placed at the end of a carrier-lever, H, having its point of support at I, in part of said frame A′. The needle P is affixed to one extremity, M, of a two-armed lever, M N, having its point of support at E in the frame A, the other extremity, N, reaching below the table or bed A. A short pitman or link, F, (dotted, and see diagram Fig. II,) connects the needle-carrier with a driving-crank, G, (also dotted,) on the primary shaft, and a similar link, J, connects another crank, C, on said shaft with the shuttle-driving lever H, such levers H and N and the driving-cranks G and C having proper wrist-pins at the points of connection with the links.

When the primary shaft is rotated at an ordinary uniform speed, and the needle descends, it does so with considerable celerity. In Fig. I it is fully in the cloth, and is about to recede or rise and form the loop, for the shuttle to enter.

By so forming a loop, in the usual manner, I avoid the use of any special contrivance for insuring the entrance of the point of the shuttle between the needle and its thread.

At this time the shuttle, with continuous motion, advances and passes with its bobbin through said loop, to interlace its own thread therewith, while the needle is retarded in the cloth; this is seen in the diagram, Fig. III, wherein the numerals 11 12 1 2 3, representing equal divisions of the revolution of the driving-crank on the primary shaft, show the long distance traveled by said crank, as compared with the slight movement of the needle in its own path during the same interval of time.

The retardment of the needle's motion favors the aforesaid interlacing operation of the shuttle, and its passage through the loop is made in time to admit of the needle-carrier drawing the loop from the shuttle and into the cloth, with a portion of its upward stroke remaining unexpended after the shuttle has passed through the loop, say from 3 to 7 in the diagram, Fig. III.

After the shuttle has passed through the loop the motion of the needle-carrier is accelerated, and the loop is drawn from the heel of the shuttle and to the cloth during the continuous upward motion of the needle.

I will now refer to the motion of the shuttle.

While the loop is drawing up, if the shuttle's movement be sufficiently slow, opportunity is afforded for drawing the threads of the needle and shuttle taut at about the same time, if desired, in finishing the stitch. I therefore arrange the crank mechanism so as to impart a retarded motion to the shuttle, beginning at about the time when the heel of the shuttle passes the needle and escapes from the loop, and continuing until the shuttle reaches the end of its stroke. This retardation will be apparent by observing the very little motion made by the shuttle as compared with that of the crank C in the same interval of time, as indicated by the corresponding numerals marked in the paths of each, say from 4 to 7, in the diagram, Fig. IV.

It is of advantage to have the shuttle pass through the loop quickly, as that allows of a less retardation of the needle's motion, rendering it more equable than it would otherwise be. I therefore have the cranks and connections arranged for imparting an accelerated motion to the shuttle while passing through the loop. Such acceleration is seen in the long distance traveled by the shuttle as compared with that of the driving-crank C in the same interval of time, as indicated by the corresponding numerals marked on the paths of each, say from 1 to 4 in the diagram, Fig. IV.

In the modification, Fig. V, showing the connection of the shuttle-crank as made to a crank-arm affixed to one end of a rockingshaft, to the other end of which is affixed the shuttle-carrier, the line of movement of the center of connection of the link to the said crank-arm lies above the center of D, and this disposition thereof adds to the acceleration of the shuttle. The dotted line *x y* signifies the arc, in which which the crank end of the link swings.

I claim as my invention—

1. The combination, with the needle-carrier and the shuttle-driver, of crank mechanism, substantially as described, arranged for operation substantially as specified, whereby the needle is retarded in the cloth and forms a loop for the shuttle to enter, and the shuttle is advanced and passed through the loop while the needle's movement is retarded, for the purposes set forth.

2. The combination, with the needle-carrier and the shuttle-driver, of crank mechanism, substantially as described, arranged for operation substantially as specified, whereby the motion of the shuttle is retarded after passing through the loop during the final upward motion of the needle, for the purposes set forth.

3. The combination, with the needle-carrier and the shuttle-driver, of crank mechanism, substantially as described, arranged for operation substantially as specified, whereby the movement of the needle after the passage of the shuttle through the loop is accelerated, while that of the shuttle is retarded, for the purpose set forth.

4. The combination, with the needle-carrier and the shuttle-driver, of crank mechanism, substantially as described, arranged for operation substantially as specified, whereby the motion of the shuttle when passing through the loop is accelerated, while that of the needle is retarded, for the purposes set forth.

5. The combination, with the shuttle, the carrier-lever H, and the primary shaft D, provided with a crank, of the connecting-link J, as and for the purpose described.

EARLE H. SMITH.

Witnesses:
WILLIAM MUNCH,
HENRY E. ROEDER.